(12) United States Patent
Funabiki et al.

(10) Patent No.: US 8,546,491 B2
(45) Date of Patent: Oct. 1, 2013

(54) POLYOLEFIN-BASED COMPOSITE RESIN SPHERICAL PARTICLES, COATING COMPOSITION, AND COATED OBJECT

(75) Inventors: Yuhei Funabiki, Tokyo (JP); Toshiaki Fujiwara, Hyogo (JP); Hirofumi Fujita, Tokyo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

(21) Appl. No.: 13/394,287

(22) PCT Filed: Sep. 2, 2010

(86) PCT No.: PCT/JP2010/065015
§ 371 (c)(1),
(2), (4) Date: Apr. 30, 2012

(87) PCT Pub. No.: WO2011/027818
PCT Pub. Date: Mar. 10, 2011

(65) Prior Publication Data
US 2012/0208926 A1    Aug. 16, 2012

(30) Foreign Application Priority Data
Sep. 4, 2009   (JP) ................................. 2009-204583

(51) Int. Cl.
| | | |
|---|---|---|
| C08J 3/12 | (2006.01) | |
| B05D 7/24 | (2006.01) | |
| C08L 23/04 | (2006.01) | |
| C08L 23/12 | (2006.01) | |
| C08L 29/04 | (2006.01) | |
| C08L 33/02 | (2006.01) | |
| C08L 33/08 | (2006.01) | |
| C08L 33/12 | (2006.01) | |
| C08L 71/02 | (2006.01) | |
| C09D 7/12 | (2006.01) | |
| C09D 201/00 | (2006.01) | |

(52) U.S. Cl.
USPC ........... 525/191; 525/194; 525/197; 525/221; 525/222; 525/240

(58) Field of Classification Search
USPC .................. 525/191, 194, 197, 221, 222, 240
See application file for complete search history.

(56) References Cited

U.S. PATENT DOCUMENTS
7,456,241 B2 * 11/2008 McFaddin et al. ............ 525/192

FOREIGN PATENT DOCUMENTS
| EP | 0 491 101 | 6/1992 |
|---|---|---|
| JP | 54-146855 | 11/1979 |
| JP | 59-187027 | 10/1984 |
| JP | 60-212430 | 10/1985 |
| JP | 62-149767 | 7/1987 |
| JP | 3-162465 | 7/1991 |
| JP | 7-003032 | 1/1995 |
| JP | 2000-129166 | 5/2000 |
| JP | 2003-212947 | 7/2003 |
| JP | 2006-045295 | 2/2006 |

* cited by examiner

Primary Examiner — Nathan M Nutter
(74) Attorney, Agent, or Firm — Hamre, Schumann, Mueller & Larson, P.C.

(57) ABSTRACT

The present invention provides a polyolefin-based composite resin spherical particle that gives a coating film having a matte appearance, a soft feeling, and excellent scratch resistance by being used for a coating material. The present invention also provides a coating composition containing the polyolefin-based composite resin spherical particle and a coating resin, and a coated article obtained by applying the coating composition to a substrate.

The invention relates to a polyolefin-based composite resin spherical particle, which is a spherical particle obtained by mixing 100 parts by mass of a polyolefin-based resin, 40 to 1,500 parts by mass of water, and 3 to 30 parts by mass of an ethylene oxide/propylene oxide copolymer having a weight average molecular weight of 4,000 to 30,000 to prepare a mixture, emulsifying the mixture at a temperature of the highest melting point of the polyolefin-based resin or higher, and cooling the mixture from a temperature at least 25° C. higher than the highest crystallization temperature of the polyolefin-based resin to a temperature at least 25° C. lower than the lowest crystallization temperature of the polyolefin-based resin at a cooling speed of 0.2° C./min or more, wherein the polyolefin-based resin is a composite resin containing 5 to 70% by mass of a partially saponified ethylene/vinyl acetate copolymer.

3 Claims, No Drawings

POLYOLEFIN-BASED COMPOSITE RESIN SPHERICAL PARTICLES, COATING COMPOSITION, AND COATED OBJECT

TECHNICAL FIELD

The present invention relates to a polyolefin-based composite resin spherical particle that gives a coating film having a matte appearance, a soft feeling, and excellent scratch resistance by being used for a coating material. The present invention also relates to a coating composition containing the polyolefin-based composite resin spherical particle and a coating resin, and a coated article obtained by applying the coating composition to a substrate.

BACKGROUND ART

In order to impart a matte appearance and high quality and improve texture, coating materials have been conventionally used for substrates such as household goods, automobile interiors, OA equipment, building materials, and electric appliances. For example, vinyl-based resins, alkyd-based resins, polyolefin-based resins, and the like resins have been used for surface coating of plastic molded products and metal products of automobile interiors, and the like.

As a method of giving a matte appearance and high quality to a coating film, Patent Document 1, for example, discloses a method of adding fine powder of varnish, color polymer beads, silica, and/or polyethylene wax to a coating material, Patent Document 2 discloses a method of adding polyolefin fine particles having specific physical properties to a coating material, and Patent Document 3 discloses a method of adding spherical cellulose having an average particle size of 300 μm or smaller to a coating material.

As a method of imparting a soft feeling to improve texture, Patent Document 4 discloses a method of adding lanolin-deposited polyurethane resin particles to a coating material, and Patent Document 5 discloses a method of adding foamed polyurethane resin powder to a coating material.

However, coating compositions obtained by the methods disclosed in Patent Documents 1 to 5 do not impart a sufficient matte appearance and soft feeling to a coating film to be obtained.

In contrast, Patent Document 6 discloses polyolefin-based resin particles produced by emulsifying and cooling polyolefin-based resin, an ethylene oxide/propylene oxide copolymer, and water under specific conditions. On the other hand, in recent years, there has arisen a problem in that rubbing and the like cause particles to fall from the surface of a coating film, whereby the rubbed portions become whitish, appearing as conspicuous scratches. In order to solve such a problem, a coating film that does not easily allow particles to fall from its surface and which suppresses scratches (that is, excellent in scratch resistance) has been increasingly demanded.

Patent Document 1: Japanese Kokai Publication Hei-3-17164 (JP-A Hei-3-17164)
Patent Document 2: Japanese Kokai Publication Sho-59-187027 (JP-A Sho-59-187027)
Patent Document 3: Japanese Kokai Publication Hei-3-162465 (JP-A Hei-3-162465)
Patent Document 4: Japanese Kokai Publication 2003-212947 (JP-A 2003-212947)
Patent Document 5: Japanese Kokai Publication Sho-62-149767 (JP-A Sho-62-149767)
Patent Document 6: Japanese Kokai Publication 2006-45295 (JP-A 2006-45295)

SUMMARY OF THE INVENTION

Problems to be Solved by the Invention

The present invention aims to provide a polyolefin-based composite resin spherical particle that gives a coating film having a matte appearance, a soft feeling, and excellent scratch resistance by being used for a coating material. The present invention also aims to provide a coating composition containing the polyolefin-based composite resin spherical particle and a coating resin, and a coated article obtained by applying the coating composition to a substrate.

Means for Solving the Problems

The present invention relates to:
item 1. a polyolefin-based composite resin spherical particle, which is a spherical particle obtained by mixing 100 parts by mass of a polyolefin-based resin, 40 to 1,500 parts by mass of water, and 3 to 30 parts by mass of an ethylene oxide/propylene oxide copolymer having a weight average molecular weight of 4,000 to 30,000 to prepare a mixture, emulsifying the mixture at a temperature of the highest melting point of the polyolefin-based resin or higher, and cooling the mixture from a temperature at least 25° C. higher than the highest crystallization temperature of the polyolefin-based resin to a temperature at least 25° C. lower than the lowest crystallization temperature of the polyolefin-based resin at a cooling speed of 0.2° C./min or more, wherein the polyolefin-based resin is a composite resin containing 5 to 70% by mass of a partially saponified ethylene/vinyl acetate copolymer;
item 2. the polyolefin-based composite resin spherical particle according to item 1, wherein the polyolefin-based resin contains at least one species selected from the group consisting of polyethylene, polypropylene, an ethylene/(meth)acrylic acid copolymer, and an ethylene/methyl (meth)acrylate copolymer;
item 3. the polyolefin-based composite resin spherical particle according to item 1 or 2, wherein the partially saponified ethylene/vinyl acetate copolymer contains 0.5 to 20% by mass of a segment derived from vinyl acetate, and a saponification degree of the segment derived from vinyl acetate is 30 to 98% by mole;
item 4. a coating composition, comprising: the polyolefin-based composite resin spherical particle according to item 1, 2, or 3; and a coating resin; and
item 5. a coated article, which is obtained by applying the coating composition according to item 4 to a substrate.

The present inventors have found that a coating film having a matte appearance, a soft feeling, and excellent scratch resistance can be produced in the case of using a coating composition containing polyolefin-based composite resin spherical particles, which are obtained by mixing a polyolefin-based composite resin containing a predetermined amount of a partially saponified ethylene/vinyl acetate copolymer, water, and an ethylene oxide/propylene oxide copolymer, and emulsifying and cooling the mixture under specific conditions, leading to completion of the present invention.

The polyolefin-based composite resin spherical particles of the present invention are obtained by mixing predetermined amounts of the below-mentioned polyolefin-based resin, water, and ethylene oxide/propylene oxide copolymer in a dispersion bath to prepare a mixture, stirring and emulsifying the mixture at a temperature of the highest melting point of the polyolefin-based resin or higher, and then cooling the mixture by the below-mentioned method.

The polyolefin-based resin is a composite resin containing 5 to 70% by mass of a partially saponified ethylene/vinyl acetate copolymer.

If the amount of the partially saponified ethylene/vinyl acetate copolymer in the polyolefin-based resin is less than 5% by mass, a coating film to be obtained has low scratch resistance. If the amount of the partially saponified ethylene/vinyl acetate copolymer is more than 70% by mass, particles tend to have reduced solvent resistance and be vulnerable. The amount of the partially saponified ethylene/vinyl acetate copolymer is preferably 7% by mass in the lower limit and 65% by mass in the upper limit, and more preferably 10% by mass in the lower limit and 60% by mass in the upper limit.

The amount of the segment derived from vinyl acetate in the partially saponified ethylene/vinyl acetate copolymer is not particularly limited. The preferable lower limit thereof is 0.5% by mass, and the preferable upper limit thereof is 20% by mass. If the amount of the segment derived from vinyl acetate is less than 0.5% by mass, a required adhesion performance with a coating component may not be demonstrated. If the amount of the segment derived from vinyl acetate is more than 20% by mass, the thermal stability may deteriorate. The amount of the segment derived from vinyl acetate is more preferably 1% by mass in the lower limit and 18% by mass in the upper limit.

The saponification degree of the segment derived from vinyl acetate in the partially saponified ethylene/vinyl acetate copolymer is preferably 30% by mole in the lower limit and 98% by mole in the upper limit. If the saponification degree is less than 30% by mole, the scratch resistance of a coating film to be obtained may be insufficient. Even if the saponification degree exceeds 98% by mole, a further effect on scratch resistance is not achieved. The more preferable lower limit of the saponification degree is 35% by mole.

Examples of other polyolefin-based resins compounded with the partially saponified ethylene/vinyl acetate copolymer include a polyolefin resin, and a copolymer resin of olefin and other monomers.

The polyolefin resin is not particularly limited, and examples thereof include an olefin homopolymer, a copolymer of different olefins, and acid modified products of these.

The olefin homopolymer is not particularly limited, and examples thereof include polyethylene and polypropylene.

The copolymer of different olefins is not particularly limited, and examples thereof include an ethylene/propylene copolymer, an ethylene/1-butene copolymer, an ethylene/1-octene copolymer, and an ethylene/1-hexene copolymer.

The acid modified products of the olefin homopolymer and the copolymer of different olefins are not particularly limited, and examples thereof include maleic anhydride modified polyethylene and maleic anhydride modified polypropylene.

The olefin in the copolymer resin of the olefin and other monomers is not particularly limited, and examples thereof include ethylene and propylene.

The above other monomers are not particularly limited as long as they are monomers copolymerizable with the olefin. Examples thereof include vinyl ester, α,β-unsaturated carboxylic acid, α,β-unsaturated carboxylic acid anhydride, metal salts of α,β-unsaturated carboxylic acid, and α,β-unsaturated carboxylic acid ester.

The vinyl ester is not particularly limited, and examples thereof include vinyl acetate.

The α,β-unsaturated carboxylic acid is not particularly limited, and examples thereof include (meth)acrylic acid.

The α,β-unsaturated carboxylic acid anhydride is not particularly limited, and examples thereof include maleic anhydride.

The metal salts of the α,β-unsaturated carboxylic acid are not particularly limited, and examples thereof include sodium salts and magnesium salts of (meth)acrylic acid.

The α,β-unsaturated carboxylic acid ester is not particularly limited, and examples thereof include methyl (meth)acrylate, ethyl (meth)acrylate, and glycidyl (meth)acrylate.

The term "(meth)acryl" used herein refers to "acryl" or "methacryl".

Specific examples of the copolymer resin of the olefin with other monomers include an ethylene/vinyl acetate copolymer, an ethylene/(meth)acrylic acid copolymer, an ethylene/maleic anhydride copolymer, a propylene/maleic anhydride copolymer, an ethylene/methyl (meth)acrylate copolymer, an ethylene/glycidyl (meth)acrylate copolymer, an ethylene/glycidyl (meth)acrylate/methyl (meth)acrylate copolymer, an ethylene/glycidyl (meth)acrylate/vinyl acetate copolymer, an ethylene/methyl (meth)acrylate/maleic anhydride copolymer, and metal salts of these.

As the above other polyolefin-based resins, polyethylene, polypropylene, ethylene/(meth)acrylic acid copolymer, an ethylene/methyl (meth)acrylate copolymer are suitably used from the viewpoints of their low costs and easy processability.

The partially saponified ethylene/vinyl acetate copolymer may be compounded with the above other polyolefin-based resins by kneading these two in melting resins. The compounding method may be, for example, a known method of using a twin screw roller, a single screw extruder, a twin screw extruder, or the like. A twin screw extruder is suitably used among these because resins can be compounded more uniformly.

The water has a role of a dispersion medium. The amount of the water is 40 parts by mass in the lower limit and 1,500 parts by mass in the upper limit, for 100 parts by mass of the polyolefin-based resin. An amount of the water of less than 40 parts by mass causes difficulty in emulsifying the polyolefin-based resin. An amount of the water of more than 1,500 parts by mass causes deterioration of the volume efficiency and reduction in productivity. The amount of the water is preferably 75 parts by mass in the lower limit and 500 parts by mass in the upper limit.

The ethylene oxide/propylene oxide copolymer mainly has a role of a surfactant for emulsification.

The weight average molecular weight of the ethylene oxide/propylene oxide copolymer is 4,000 in the lower limit and 30,000 in the upper limit. The weight average molecular weight of the ethylene oxide/propylene oxide copolymer of less than 4,000 causes difficulty in emulsifying the polyolefin-based resin. The ethylene oxide/propylene oxide copolymer having a weight average molecular weight of more than 30,000 is difficult to obtain, and impractical. The weight average molecular weight of the ethylene oxide/propylene oxide copolymer is preferably 6,000 in the lower limit and 20,000 in the upper limit, and more preferably 8,000 in the lower limit and 16,000 in the upper limit.

The weight average molecular weight used herein refers to a value which is determined by gel permeation chromatography (GPC) using polystyrene as the standard material. Examples of a column used in determining the weight average molecular weight by GPC using polystyrene as the standard material include TSK-GEL HHR (produced by TOSOH Corporation).

The amount of the ethylene oxide/propylene oxide copolymer is 3 parts by mass in the lower limit and 30 parts by mass in the upper limit, for 100 parts by mass of the polyolefin-based resin. An amount of the ethylene oxide/propylene oxide copolymer of less than 3 parts by mass causes difficulty in emulsifying the polyolefin-based resin. Even if the amount of the ethylene oxide/propylene oxide copolymer is more than 30 parts by mass, the effect that corresponds to the amount is not efficiently exerted. The amount of the ethylene oxide/propylene oxide copolymer is preferably 5 parts by mass in the lower limit and 20 parts by mass in the upper limit.

The amount of the segment derived from ethylene oxide in the ethylene oxide/propylene oxide copolymer is not particularly limited. The preferable lower limit thereof is 40% by mass, and the preferable upper limit thereof is 95% by mass. If the amount of the segment derived from ethylene oxide is less than 40% by mass or more than 95% by mass, it may be difficult to emulsify the polyolefin-based resin. The amount of the segment derived from ethylene oxide is more preferably 45% by mass in the lower limit and 90% by mass in the upper limit.

The dispersion bath is a pressure container provided with a suitable heating means with which the polyolefin-based resin can be heated to a temperature of the highest melting point of the polyolefin-based resin or higher and a stirring means that can impart sufficient shear force to the contents. Examples thereof include a pressure autoclave with a stirrer, a pressure homogenizer, and a twin screw extruder.

The polyolefin-based resin is heated to a temperature of the highest melting point or higher in the dispersion bath and melted, and subjected to shear force by stirring to form spherical fine particles.

The highest melting point of the polyolefin-based resin refers to a higher melting point selected from one or two or more of shown endothermic peaks determined with a differential thermal analyzer.

The polyolefin-based resin is emulsified and then cooled, whereby a water dispersion of polyolefin-based composite resin spherical particles is obtained. In the cooling, in the case where the polyolefin-based resin is cooled from a temperature at least 25° C. higher than the highest crystallization temperature of the polyolefin-based resin to a temperature at least 25° C. lower than the lowest crystallization temperature of the polyolefin-based resin at a cooling speed of 0.2° C./min or more, the aggregation of the polyolefin-based composite resin spherical particles can be suppressed. The obtained water dispersion of the polyolefin-based composite resin spherical particles is filtered, washed, and dried, whereby spherical polyolefin-based composite resin spherical particles can be produced. In addition, the water dispersion of the polyolefin-based composite resin spherical particles can be used as it is depending on the application.

The highest crystallization temperature of the polyolefin-based resin refers to a higher point selected from one or two or more of shown endothermic peaks determined with a differential thermal analyzer. The lowest crystallization temperature of the polyolefin-based resin refers to a lower point selected from one or two or more of shown endothermic peaks determined with a differential thermal analyzer.

The volume average particle size of the polyolefin-based composite resin spherical particles of the present invention is preferably 3 µm in the lower limit and 50 µm in the upper limit. If the volume average particle size is less than 3 µm, the polyolefin-based composite resin spherical particles tend to be buried in a coating film to be obtained, and the matte appearance and soft feeling may not be exhibited. If the volume average particle size is more than 50 µm, the surface of a coating film to be obtained may be rough, likely leading to deterioration of the appearance and feel of the coating film.

The volume average particle size is more preferably 5 µm in the lower limit and 30 µm in the upper limit.

The volume average particle size used herein is a volume average particle size determined by an electric detection particle size distribution measuring device ("Coulter Multisizer" produced by Beckman Coulter, Inc.).

The coating composition containing the polyolefin-based composite resin spherical particles and the coating resin of the present invention is also one aspect of the present invention.

In the case where the coating composition of the present invention contains the polyolefin-based composite resin spherical particles of the present invention, a coating film that has a matte appearance and a soft feeling and also exhibits excellent scratch resistance can be formed.

The amount of the polyolefin-based composite resin spherical particles of the present invention in the coating composition of the present invention is not particularly limited. The lower limit thereof is 1 part by mass, and the upper limit thereof is 50 parts by mass, for 100 parts by mass of the coating resin in the coating composition. If the amount of the polyolefin-based composite resin spherical particles of the present invention is less than 1 part by mass, the amount of the polyolefin-based composite resin spherical particles exposed on the surface of a coating film to be obtained may be small, and a matte appearance and a soft feeling may be insufficiently imparted. If the amount of the polyolefin-based composite resin spherical particles of the present invention is more than 50 parts by mass, the appearance and feel of a coating film to be obtained deteriorates, and the film strength may decrease. The more preferable lower limit of the amount of the polyolefin-based composite resin spherical particles of the present invention is 2 parts by mass, and the more preferable upper limit thereof is 30 parts by mass.

The coating resin is not particularly limited, and commonly used coating resins may be employed. Specific examples thereof include cellulose-based resin, alkyd-based resin, polyester-based resin, epoxy-based resin, vinyl chloride-based resin, urethane-based resin, acrylic silicone-based resin, fluorine-based resin, vinyl acetate-based resin, acrylic resin, acrylic urethane-based resin, polyvinyl butyral-based resin, and melamine-based resin. Urethane-based resin, acrylic resin, and acrylic urethane-based resin are suitably used among these coating resins because a coating film to be obtained exhibits an improved soft feeling. Each of these coating resins may be used alone, or two or more of these may be used in combination.

The concentration of the coating resin in the coating composition of the present invention is not particularly limited. The lower limit of the concentration is 5% by mass and the upper limit thereof is 99% by mass from the viewpoints of the viscosity of a coating composition to be obtained and the thickness of a coating film to be obtained. If the concentration of the coating resin is less than 5% by mass, the viscosity of a coating composition to be obtained may decrease, and liquid sagging, cissing, and the like may occur upon applying the coating composition to a substrate. The more preferable lower limit of the concentration of the coating resin is 10% by mass.

The coating composition of the present invention is applicable to various coating materials. Specific examples thereof include an evaporation drying-type coating material in which a solvent such as acrylic lacquer or nitrocellulose lacquer evaporates to form a coating film; a fusion drying-type coating material in which resin particles aggregate when a solvent such as a (water-soluble, solvent-based) acrylic emulsion coating material evaporates; a moisture curing-type coating material that cures while reacting with moisture in the air, such as a moisture curing-type urethane resin coating material or an acrylic-silicone-resin coating material; a polymerization drying-type coating material in which a main agent is reacted with a curing agent to form a coating film such as a two-pack urethane coating material or a two-pack epoxy coating material; a thermosetting urethane resin coating material; a thermosetting acrylic resin coating material; a powder coating material; a high-temperature reaction curing-type coating material that cures in evaporation of a solvent by heating or in reaction of resins, such as an electrodeposition coating material; and an ultraviolet curing-type coating material that ultraviolet-cures an acrylic compound containing monomers, oligomers, and ultraviolet radiation initiators.

The coating composition of the present invention may contain a solvent from the viewpoint of coating workability. The solvent is not particularly limited, and examples thereof include an aromatic hydrocarbon solvent, an aliphatic hydrocarbon solvent, an ester solvent, a ketone solvent, an alcohol solvent, and an ether solvent. In the case where the solvent is applied to the fusion drying-type coating material, examples of the dispersion medium include water and/or a water-soluble organic solvent. Examples of the water-soluble organic solvent include: water-soluble alcohols such as methanol, ethanol, and isopropanol; glycols; and glycol ethers.

The coating composition of the present invention may be mixed, for example, with: resin particles made of polyethylene resin, polypropylene resin, acrylic resin, urethane resin, or silicone resin; inorganic particles such as silica, talc, zinc oxide, and titanium oxide; a pigment; a dye; a leveling agent; a wetting agent; a polymeric dispersant; or a thickener as long as they do not inhibit the object of the present invention.

The coated article obtained by applying the coating composition of the present invention to a substrate is also one aspect of the present invention.

The substrate is not particularly limited, and examples thereof include metal, wood, paper, film products, plastic molded products, and elastomers.

The metal is not particularly limited, and examples thereof include stainless steel, aluminum, copper, and brass.

The film products and the plastic molded products are not particularly limited, and examples thereof include fully aromatic polyester resin, epoxy resin, polycarbonate, polystyrene, ABS, polyethylene, polypropylene, polyacetal, cellulose, polyethylene terephthalate, polybutylene terephthalate, polyvinyl chloride, polyamide, polyphenylene oxide, polyurethane, and unsaturated polyester.

The elastomer is not particularly limited, and examples thereof include: vulcanizable rubbers such as natural rubber, chloroprene rubber, urethane rubber, fluororubber, silicone rubber, and fluorosilicone rubber; and thermoplastic elastomers such as an olefin-based elastomer, a styrene-based elastomer, a urethane-based elastomer, a polyester-based elastomer, and a polyamide-based elastomer.

The method for applying the coating composition of the present invention to the substrate is not particularly limited, and examples thereof include brushing, roller coating, and spray coating. Further, in order to improve coating efficiency, electrostatic spray coating, curtain coating, roll coater coating, and dip coating, and the like coating methods can be used.

The coating film thickness of the coated article of the present invention is not particularly limited as long as the polyolefin-based composite resin spherical particles of the present invention are exposed on the surface of the coating film. The preferable lower limit thereof is 5 µm, the preferable upper limit thereof is 100 µm, and the more preferable upper limit thereof is 50 µm. The coating film thickness can be adjusted to the above preferable range by a known coating method.

The reasons why the coating film on the coated article of the present invention obtained from the coating composition of the present invention has a matte appearance, a soft feeling, and excellent scratch resistance are not clear, but is presumably due to the following.

That is, one reason is presumably that the polyolefin-based composite resin spherical particles obtained by compounding the coating resin with the partially saponified ethylene/vinyl acetate copolymer and other polyolefin-based resins exhibit a soft feeling, and further formation of the coating film having irregularities on its surface causes appropriate surface roughness. Another reason is conceivably that part of light applied to the formed coating film surface is irregularly reflected on the coating film surface, whereby gloss is controlled and a matte appearance is exerted. Another reason is probably that the hydroxyl portion of the partially saponified ethylene/vinyl acetate copolymer is sufficiently blended with a coating film component, whereby the polyolefin-based composite resin spherical particles are bonded to the coating film and less likely to fall, leading to improvement in scratch resistance.

In contrast, in the case that, instead of the polyolefin-based composite resin spherical particles of the present invention, a particle mixture obtained by blending spherical particles made of the partially saponified ethylene/vinyl acetate copolymer and spherical particles made of other polyolefin-based resins at a predetermined ratio is added to a coating composition to form a coating film, the coating film exhibits a matte appearance and a soft feeling, but is inferior in scratch resistance. This is likely because the polyolefin-based resin is not sufficiently compounded, which means that the adhesion of the particles to the coating film is not improved.

Effect of the Invention

The present invention provides a polyolefin-based composite resin spherical particle which gives a coating film having a matte appearance, a soft feeling, and excellent scratch resistance by being used for a coating material. The present invention also provides a coating composition containing the polyolefin-based composite resin spherical particle and a coating resin, and a coated article obtained by applying the coating composition to a substrate.

MODE(S) FOR CARRYING OUT THE INVENTION

Hereinafter, the present invention will be described in further detail referring to examples, and the present invention is not limited only to these examples.
(Preparation of Acrylic Resin Coating Material)

An acrylic resin coating material (100 parts by mass) ("Pla-Ace" produced by Musashi Paint Co., Ltd.) and a synthetic resin thinner (40 parts by mass) ("Pla-Ace thinner" produced by Musashi Paint Co., Ltd.) were mixed to prepare an acrylic resin coating material containing 25% by mass of an acrylic coating resin.
(Preparation of Acrylic Urethane Resin Coating Material)

An acrylic urethane resin coating material (100 parts by mass) ("Acrydic A-801P" produced by DIC Corporation), butyl acetate (28 parts by mass), and toluene (72 parts by mass) were mixed to prepare an acrylic urethane resin coating material containing 25% by mass of an acrylic urethane coating resin.

(Preparation of Polyolefin-Based Composite Resin Spherical Particles A)

Polyethylene ("Sumikasen G-807" produced by Sumitomo Chemical Co., Ltd., resin melting point: 105° C., crystallization temperature: 90° C.) was blended with a partially saponified ethylene/vinyl acetate copolymer ("Mersen H6822X" produced by TOSOH Corporation, amount of a segment derived from vinyl acetate: 5.5% by mass, saponification degree: 80% by mole, resin melting point: 100° C., crystallization temperature: 86° C.) to produce a resin so that the resin contained 30% by mass of the partially saponified ethylene/vinyl acetate copolymer. The resin was melt-kneaded with a twin screw extruder ("KZW-15TW" produced by Technovel Corporation) to produce a composite resin.

A pressure autoclave having two turbine impellers each with a diameter of 50 mm and having an internal diameter of 94 mm, a height of 230 mm, and an internal volume of 1.6 L was charged with the produced composite resin (0.16 kg), water (0.216 kg), an ethylene oxide/propylene oxide copolymer (0.024 kg) ("Pluronic F108" produced by ADEKA Corporation, amount of ethylene oxide: 80% by mass) having a weight average molecular weight of 15,500, and was sealed. Then, the autoclave was heated from the outside, so that the temperature inside the autoclave was raised to 160° C., a temperature of the resin melting point or higher. Thereafter, these components in the autoclave were stirred with the turbine impellers at 200 rpm for 30 minutes to emulsify the resin. Subsequently, the cooling rate for internal temperatures in the range of 120° C. to 60° C. was adjusted to 0.4° C./min for cooling. The water dispersion of the obtained polyolefin-based composite resin spherical particles was filtered and dried to produce polyolefin-based composite resin spherical particles A.

(Preparation of Polyolefin-Based Composite Resin Spherical Particles B)

Polyolefin-based composite resin spherical particles B were produced in the same manner as the polyolefin-based composite resin spherical particles A, except that the composite resin contained 10% by mass of the partially saponified ethylene/vinyl acetate copolymer.

(Preparation of Polyolefin-Based Composite Resin Spherical Particles C)

Polyolefin-based composite resin spherical particles C were produced in the same manner as the polyolefin-based composite resin spherical particles A, except that the composite resin contained 5% by mass of the partially saponified ethylene/vinyl acetate copolymer.

(Preparation of Polyolefin-Based Composite Resin Spherical Particles D)

Polyolefin-based composite resin spherical particles D were produced in the same manner as the polyolefin-based composite resin spherical particles A, except that the composite resin contained 70% by mass of the partially saponified ethylene/vinyl acetate copolymer.

(Preparation of Polyolefin-Based Composite Resin Spherical Particles E)

A composite resin was produced in the same manner as the polyolefin-based composite resin spherical particles A, except that polyethylene ("Sumikasen G-807" produced by Sumitomo Chemical Co., Ltd.) was blended with a partially saponified ethylene/vinyl acetate copolymer ("Mersen H6410M" produced by TOSOH Corporation, amount of vinyl acetate: 17.5% by mass, saponification degree: 36.4% by mole, resin melting point: 75° C., crystallization temperature: 71° C.) so as to contain 30% by mass of the partially saponified ethylene/vinyl acetate copolymer. Fine particles of the obtained composite resin were formed and polyolefin-based composite resin spherical particles E were produced in the same manner as the polyolefin-based composite resin spherical particles A, except that the temperature range for which the cooling rate was adjusted was 120° C. to 45° C.

(Preparation of Polyolefin-Based Composite Resin Spherical Particles F)

A composite resin was produced in the same manner as the polyolefin-based composite resin spherical particles A, except that an ethylene/acrylic acid copolymer ("Rexpearl EAA A210M" produced by Japan Polyethylene Corporation, resin melting point: 100° C., crystallization temperature: 90° C.) was blended with a partially saponified ethylene/vinyl acetate copolymer ("Mersen H6822X" produced by TOSOH Corporation, amount of vinyl acetate: 5.5% by mass, saponification degree: 80% by mole) so as to contain 30% by mass of a partially saponified ethylene/vinyl acetate copolymer. Fine particles of the obtained composite resin were formed and polyolefin-based composite resin spherical particles F were produced in the same manner as the polyolefin-based composite resin spherical particles A, except that the temperature inside the autoclave in emulsification was adjusted to 190° C.

(Preparation of Polyolefin-Based Composite Resin Spherical Particles G)

A composite resin was produced in the same manner as the polyolefin-based composite resin spherical particles A, except that an ethylene/methyl methacrylate copolymer ("Acryft WD-301" produced by Sumitomo Chemical Co., Ltd., resin melting point: 100° C., crystallization temperature: 82° C.) was blended with a partially saponified ethylene/vinyl acetate copolymer ("Mersen H6822X" produced by TOSOH Corporation, amount of vinyl acetate: 5.5% by mass, saponification degree: 80% by mole) so as to contain 30% by mass of a partially saponified ethylene/vinyl acetate copolymer. Fine particles of the obtained composite resin were formed and polyolefin-based composite resin spherical particles G were produced in the same manner as the polyolefin-based composite resin spherical particles A, except that the temperature inside the autoclave in emulsification was adjusted to 190° C. and the cooling speed was adjusted in the temperature range of 120° C. to 55° C.

(Preparation of Polyolefin-Based Composite Resin Spherical Particles H)

Polyolefin-based composite resin spherical particles H were produced in the same manner as the polyolefin-based composite resin spherical particles A, except that the composite resin contained 3% by mass of the partially saponified ethylene/vinyl acetate copolymer.

(Preparation of Polyolefin-Based Composite Resin Spherical Particles I)

Polyolefin-based composite resin spherical particles I were produced in the same manner as the polyolefin-based composite resin spherical particles A, except that the composite resin contained 75% by mass of the partially saponified ethylene/vinyl acetate copolymer.

(Preparation of Polyolefin-Based Composite Resin Spherical Particles J)

Polyolefin-based composite resin spherical particles J were tried to be produced by the same operation as the polyolefin-based composite resin spherical particles A, except that after emulsification, the cooling rate for internal temperatures in the range of 120° C. to 60° C. was adjusted to 0.1° C./min for cooling. However, the obtained particles in the water dispersion aggregated, and were not filtered. Thus, solid particles were not produced.

(Particle Size and Particle Shape of Polyolefin-Based Composite Resin Spherical Particles)

Each of 0.1 g of the obtained polyolefin-based composite resin spherical particles A to I was dispersed in 10 g of water, and the volume average particle size thereof was determined with an electric detection particle size distribution measuring device ("Coulter Multisizer" produced by Beckman Coulter, Inc.). Table 1 shows the results.

Then, the particle shape was observed with a scanning electron microscope ("JSM-6390LA" produced by JEOL Ltd.) at a magnification of 50 to 300 times, and all of the polyolefin-based composite resin spherical particles A to I were spherical.

EXAMPLE 1

The prepared acrylic resin coating material (10 g) was mixed with polyolefin-based composite resin spherical particles A (0.25 g) to prepare an acrylic resin coating composition.

EXAMPLE 2

An acrylic resin coating composition was prepared as in Example 1, except that polyolefin-based composite resin spherical particles B were used instead of the polyolefin-based composite resin spherical particles A.

EXAMPLE 3

An acrylic resin coating composition was prepared as in Example 1, except that polyolefin-based composite resin spherical particles C were used instead of the polyolefin-based composite resin spherical particles A.

EXAMPLE 4

An acrylic resin coating composition was prepared as in Example 1, except that polyolefin-based composite resin spherical particles D were used instead of the polyolefin-based composite resin spherical particles A.

EXAMPLE 5

An acrylic resin coating composition was prepared as in Example 1, except that polyolefin-based composite resin spherical particles E were used instead of the polyolefin-based composite resin spherical particles A.

EXAMPLE 6

An acrylic resin coating composition was prepared as in Example 1, except that polyolefin-based composite resin spherical particles F were used instead of the polyolefin-based composite resin spherical particles A.

EXAMPLE 7

An acrylic resin coating composition was prepared as in Example 1, except that polyolefin-based composite resin spherical particles G were used instead of the polyolefin-based composite resin spherical particles A.

EXAMPLE 8

The prepared acrylic urethane resin coating material (10 g) was mixed with polyolefin-based composite resin spherical particles A (0.25 g), and a polyisocyanate compound ("Barnock DN980" produced by DIC Corporation) (0.5 g) as a curing agent, to prepare an acrylic urethane resin coating composition.

EXAMPLE 9

An acrylic urethane resin coating composition was prepared as in Example 8, except that polyolefin-based composite resin spherical particles B were used instead of the polyolefin-based composite resin spherical particles A.

EXAMPLE 10

An acrylic urethane resin coating composition was prepared as in Example 8, except that polyolefin-based composite resin spherical particles C were used instead of the polyolefin-based composite resin spherical particles A.

EXAMPLE 11

An acrylic urethane resin coating composition was prepared as in Example 8, except that polyolefin-based composite resin spherical particles D were used instead of the polyolefin-based composite resin spherical particles A.

EXAMPLE 12

An acrylic urethane resin coating composition was prepared as in Example 8, except that polyolefin-based composite resin spherical particles E were used instead of the polyolefin-based composite resin spherical particles A.

EXAMPLE 13

An acrylic urethane resin coating composition was prepared as in Example 8, except that polyolefin-based composite resin spherical particles F were used instead of the polyolefin-based composite resin spherical particles A.

EXAMPLE 14

An acrylic urethane resin coating composition was prepared as in Example 8, except that polyolefin-based composite resin spherical particles G were used instead of the polyolefin-based composite resin spherical particles A.

COMPARATIVE EXAMPLE 1

An acrylic resin coating composition was prepared as in Example 1, except that polyethylene particles having a particle size of 11 μm were used instead of the polyolefin-based composite resin spherical particles A.

COMPARATIVE EXAMPLE 2

An acrylic resin coating composition was prepared as in Example 1, except that polymethyl methacrylate particles having a particle size of 9 μm were used instead of the polyolefin-based composite resin spherical particles A.

COMPARATIVE EXAMPLE 3

An acrylic resin coating composition was prepared as in Example 1, except that urethane particles having a particle size of 8 μm were used instead of the polyolefin-based composite resin spherical particles A.

COMPARATIVE EXAMPLE 4

An acrylic resin coating composition was prepared as in Example 1, except that a particle mixture was used instead of the polyolefin-based composite resin spherical particles A. The particle mixture was prepared by blending polyethylene particles having a particle size of 8 μm and partially saponified ethylene/vinyl acetate copolymer particles having a particle size of 9 μm so as to contain 30% by mass of a partially saponified ethylene/vinyl acetate copolymer.

COMPARATIVE EXAMPLE 5

An acrylic resin coating composition was prepared as in Example 1, except that polyolefin-based composite resin spherical particles H were used instead of the polyolefin-based composite resin spherical particles A.

COMPARATIVE EXAMPLE 6

An acrylic resin coating composition was prepared as in Example 1, except that polyolefin-based composite resin spherical particles I were used instead of the polyolefin-based composite resin spherical particles A.

COMPARATIVE EXAMPLE 7

An acrylic urethane resin coating composition was prepared as in Example 8, except that polyethylene particles having a particle size of 11 μm were used instead of the polyolefin-based composite resin spherical particles A.

COMPARATIVE EXAMPLE 8

An acrylic urethane resin coating composition was prepared as in Example 8, except that polymethyl methacrylate particles having a particle size of 9 μm were used instead of the polyolefin-based composite resin spherical particles A.

COMPARATIVE EXAMPLE 9

An acrylic urethane resin coating composition was prepared as in Example 8, except that urethane particles having a particle size of 8 μm were used instead of the polyolefin-based composite resin spherical particles A.

COMPARATIVE EXAMPLE 10

An acrylic urethane resin coating composition was prepared as in Example 8, except that a particle mixture was used instead of the polyolefin-based composite resin spherical particles A. The particle mixture was prepared by blending polyethylene particles having a particle size of 8 μm and partially saponified ethylene/vinyl acetate copolymer particles having a particle size of 9 μm so as to contain 30% by mass of a partially saponified ethylene/vinyl acetate copolymer.

COMPARATIVE EXAMPLE 11

An acrylic urethane resin coating composition was prepared as in Example 8, except that polyolefin-based composite resin spherical particles H were used instead of the polyolefin-based composite resin spherical particles A.

COMPARATIVE EXAMPLE 12

An acrylic urethane resin coating composition was prepared as in Example 8, except that polyolefin-based composite resin spherical particles I were used instead of the polyolefin-based composite resin spherical particles A.

<Evaluation>

(Preparation of Coated Article for Evaluation)

An acrylic sheet ("Acrylight" produced by Mitsubishi Rayon Co., Ltd.) was cut into a size of 7 cm×10 cm, and degreased with acetone to form a substrate.

Each of the acrylic coating compositions and acrylic urethane resin coating compositions obtained in examples and comparative examples were uniformly applied to a substrate with a Baker applicator ("No-B-2" produced by Japan Cedars Service) so as to give a coated layer having a thickness of 20 μm after drying, and dried at room temperature (about 25° C.) for 24 hours to prepare a coated article for evaluation.

The prepared coated article for evaluation was evaluated as follows. Tables 2 and 3 show the results.

(1) Matte Appearance

The prepared coated article for evaluation was evaluated for a matte appearance of the coating film by determining 60-degree glossiness with a handy gloss meter ("PG-1M" produced by Nippon Denshoku Industries Co., Ltd.) by the method in conformity with JIS Z 8741-1997.

If the 60-degree glossiness is 30 degrees or less, the matte appearance is thought to be exerted.

(2) Soft Feeling (Smoothness)

Ten subjects evaluated the hand touch feel of the coating film surface of the prepared coated article for evaluation. The case of a good soft feeling was evaluated as "2", the case of a slight soft feeling was evaluated as "1", and the case of no soft feeling was evaluated as "0". The average of the ten subjects' evaluations was calculated for evaluation of and the soft feeling of the coating film.

(3) Scratch Resistance

Ten subjects evaluated the scratch resistance as follows. The coated surface of the prepared coated article for evaluation was rubbed with the nail plate, and the case where the scratched portion was not identified even if the angle of the coated surface was changed was evaluated as "2", the case where the scratched portion was identified if the angle of the coated surface was changed was evaluated as "1", the case where the scratched portion was white and conspicuous was evaluated as "0". The average of the ten subjects' evaluations was calculated for evaluation of the scratch resistance of the coating film.

TABLE 1

|  |  | Polyolefin-based composite resin spherical particles | | | | | | | | | |
|---|---|---|---|---|---|---|---|---|---|---|---|
|  |  | A | B | C | D | E | F | G | H | I | J |
| Composite resin composition (% by mass) | Partially saponified ethylene/vinyl acetate copolymer (resin melting point: 100° C., crystallization temperature: 86° C.) | 30 | 10 | 5 | 70 | — | 30 | 30 | 3 | 75 | 30 |
|  | Partially saponified ethylene/vinyl acetate copolymer (resin melting point: 75° C., crystallization temperature: 71° C.) | — | — | — | — | 30 | — | — | — | — | — |
|  | Polyethylene (resin melting point: 105° C. crystallization temperature: 90° C.) | 70 | 90 | 95 | 30 | 70 | — | — | 97 | 25 | 70 |
|  | Ethylene/acrylic acid copolymer (resin melting point: 100° C., crystallization temperature: 90° C.) | — | — | — | — | — | 70 | — | — | — | — |
|  | Ethylene/methyl methacrylate copolymer (resin melting point: 100° C., crystallization temperature: 82° C.) | — | — | — | — | — | — | 70 | — | — | — |
| Emulsification temperature (° C.) |  | 160 | 160 | 160 | 160 | 160 | 190 | 190 | 160 | 160 | 160 |
| Cooling control conditions | Control starting temperature (° C.) | 120 | 120 | 120 | 120 | 120 | 120 | 120 | 120 | 120 | 120 |
|  | Control finishing temperature (° C.) | 60 | 60 | 60 | 60 | 45 | 60 | 55 | 60 | 60 | 60 |
|  | Cooling speed (° C./min) | 0.4 | 0.4 | 0.4 | 0.4 | 0.4 | 0.4 | 0.4 | 0.4 | 0.4 | 0.1 |
| Volume average particle size (µm) |  | 10.0 | 12.0 | 12.2 | 9.0 | 13.0 | 9.0 | 13.0 | 12.5 | 8.0 | Not obtained due to aggregation |

TABLE 2

|  | Spherical particles | Coating resin | Evaluation | | |
|---|---|---|---|---|---|
|  |  |  | 60-degree glossiness (degrees) | Soft feeling | Scratch resistance |
| Example 1 | Polyolefin-based composite resin spherical particles A | Acrylic | 12 | 2.0 | 1.9 |
| Example 2 | Polyolefin-based composite resin spherical particles B | Acrylic | 11 | 1.7 | 1.7 |
| Example 3 | Polyolefin-based composite resin spherical particles C | Acrylic | 11 | 1.7 | 1.7 |
| Example 4 | Polyolefin-based composite resin spherical particles D | Acrylic | 14 | 1.8 | 1.6 |
| Example 5 | Polyolefin-based composite resin spherical particles E | Acrylic | 15 | 1.8 | 1.5 |
| Example 6 | Polyolefin-based composite resin spherical particles F | Acrylic | 16 | 1.9 | 1.8 |
| Example 7 | Polyolefin-based composite resin spherical particles G | Acrylic | 10 | 2.0 | 1.8 |
| Example 8 | Polyolefin-based composite resin spherical particles A | Acrylic urethane | 16 | 1.9 | 1.8 |
| Example 9 | Polyolefin-based composite resin spherical particles B | Acrylic urethane | 15 | 1.9 | 1.6 |
| Example 10 | Polyolefin-based composite resin spherical particles C | Acrylic urethane | 15 | 1.8 | 1.7 |
| Example 11 | Polyolefin-based composite resin spherical particles D | Acrylic urethane | 18 | 1.8 | 1.8 |
| Example 12 | Polyolefin-based composite resin spherical particles E | Acrylic urethane | 17 | 2.0 | 1.6 |
| Example 13 | Polyolefin-based composite resin spherical particles F | Acrylic urethane | 18 | 1.8 | 1.7 |
| Example 14 | Polyolefin-based composite resin spherical particles G | Acrylic urethane | 14 | 1.8 | 1.9 |

TABLE 3

|  | Spherical particles | Coating resin | Evaluation | | |
|---|---|---|---|---|---|
|  |  |  | 60-degree glossiness (degrees) | Soft feeling | Scratch resistance |
| Comparative Example 1 | Polyethylene particles | Acrylic | 10 | 0.5 | 0.2 |
| Comparative Example 2 | Polymethyl methacrylate particles | Acrylic | 12 | 1.1 | 0.5 |
| Comparative Example 3 | Urethane particles | Acrylic | 13 | 1.2 | 0.4 |
| Comparative Example 4 | Mixture of polyethylene particles and partially saponified ethylene/vinyl acetate copolymer particles | Acrylic | 12 | 1.4 | 0.5 |
| Comparative Example 5 | Polyolefin-based composite resin spherical particles H | Acrylic | 12 | 0.7 | 0.2 |
| Comparative Example 6 | Polyolefin-based composite resin spherical particles I | Acrylic | 14 | 1.1 | 0.4 |
| Comparative Example 7 | Polyethylene particles | Acrylic urethane | 15 | 0.4 | 0.3 |
| Comparative Example 8 | Polymethyl methacrylate particles | Acrylic urethane | 17 | 0.9 | 0.3 |
| Comparative Example 9 | Urethane particles | Acrylic urethane | 18 | 1.3 | 0.4 |
| Comparative Example 10 | Mixture of polyethylene particles and partially saponified ethylene/vinyl acetate copolymer particles | Acrylic urethane | 17 | 1.5 | 0.5 |
| Comparative Example 11 | Polyolefin-based composite resin spherical particles H | Acrylic urethane | 17 | 0.5 | 0.3 |
| Comparative Example 12 | Polyolefin-based composite resin spherical particles I | Acrylic urethane | 20 | 0.8 | 0.4 |

Tables 2 and 3 prove that a coating film obtained from a coating composition in each example not only has a matte appearance and a soft feeling, but also has excellent scratch resistance.

INDUSTRIAL APPLICABILITY

The present invention provides a polyolefin-based composite resin spherical particle that gives a coating film having a matte appearance, a soft feeling, and excellent scratch resistance by being used for a coating material. The present invention also provides a coating composition containing the polyolefin-based composite resin spherical particle and a coating resin, and a coated article obtained by applying the coating composition to a substrate.

The invention claimed is:

1. A polyolefin-based composite resin spherical particle, which is a spherical particle obtained by mixing 100 parts by mass of a polyolefin-based resin, 40 to 1,500 parts by mass of water, and 3 to 30 parts by mass of an ethylene oxide/propylene oxide copolymer having a weight average molecular weight of 4,000 to 30,000 to prepare a mixture, emulsifying the mixture at a temperature of the highest melting point of the polyolefin-based resin or higher, and cooling the mixture from a temperature at least 25° C. higher than the highest crystallization temperature of the polyolefin-based resin to a temperature at least 25° C. lower than the lowest crystallization temperature of the polyolefin-based resin at a cooling speed of 0.2° C/min or more,
wherein the polyolefin-based resin is a composite resin containing 5 to 70% by mass of a partially saponified ethylene/vinyl acetate copolymer.

2. The polyolefin-based composite resin spherical particle according to claim 1,
wherein the polyolefin-based resin contains at least one species selected from the group consisting of polyethylene, polypropylene, an ethylene/(meth)acrylic acid copolymer, and an ethylene/methyl (meth)acrylate copolymer.

3. The polyolefin-based composite resin spherical particle according to claim 1,
wherein the partially saponified ethylene/vinyl acetate copolymer contains 0.5 to 20% by mass of a segment derived from vinyl acetate, and
a saponification degree of the segment derived from vinyl acetate is 30 to 98% by mole.

* * * * *